(12) United States Patent
Schroeder et al.

(10) Patent No.: US 10,249,108 B2
(45) Date of Patent: Apr. 2, 2019

(54) RISK-BASED CONTROL OF A MOTOR VEHICLE

(71) Applicant: Robert Bosch GmbH, Stuttgart (DE)

(72) Inventors: Christoph Schroeder, Pleidelsheim (DE); Oliver Pink, Stuttgart (DE); Stefan Nordbruch, Kornwestheim (DE); Ulf Wilhelm, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 225 days.

(21) Appl. No.: 15/359,007

(22) Filed: Nov. 22, 2016

(65) Prior Publication Data
US 2017/0169628 A1 Jun. 15, 2017

(30) Foreign Application Priority Data
Dec. 9, 2015 (DE) .......... 10 2015 224 696

(51) Int. Cl.
*G07C 5/08* (2006.01)
*G05D 1/00* (2006.01)
*B60W 50/023* (2012.01)
*B60W 50/04* (2006.01)

(52) U.S. Cl.
CPC .......... *G07C 5/0808* (2013.01); *B60W 50/023* (2013.01); *B60W 50/04* (2013.01); *G05D 1/0077* (2013.01); *G05D 1/0088* (2013.01); *G05D 2201/0213* (2013.01)

(58) Field of Classification Search
CPC ...... G07C 5/08; G07C 5/0808; G07C 5/0866; G07C 5/0816; G07C 5/0841; G07C 5/008; G07C 5/085; G07C 5/00
See application file for complete search history.

(56) References Cited

U.S. PATENT DOCUMENTS

| | | | | |
|---|---|---|---|---|
| 9,632,884 B2* | 4/2017 | Bittles | ................ | G06F 11/2007 |
| 9,915,950 B2* | 3/2018 | Hartung | ................ | G05D 1/021 |
| 9,971,349 B2* | 5/2018 | Pink | ................ | B60W 50/0205 |
| 9,972,054 B1* | 5/2018 | Konrardy | ................ | G07C 5/08 |
| 2008/0284575 A1* | 11/2008 | Breed | ................ | B60C 23/0493 340/438 |

(Continued)

FOREIGN PATENT DOCUMENTS

WO 2013060530 A1 5/2013

*Primary Examiner* — Courtney D Heinle
*Assistant Examiner* — Luis A Martinez Borrero
(74) *Attorney, Agent, or Firm* — Norton Rose Fulbright US LLP; Gerard Messina

(57) ABSTRACT

A highly automated driving function for controlling a motor vehicle includes a plurality of function components. A method for controlling the motor vehicle includes steps of executing the driving function using a first function component, comparing the behavior of the first function component to a specified behavior, ascertaining that the behavior of the first function component deviates from the specified behavior, ascertaining a first accident risk if the driving function continues to be executed with the aid of the first function component, ascertaining a second accident risk if the execution of the driving function continues with the aid of a second function component, and executing the driving function with the aid of the particular function component whose allocated accident risk is the lowest.

12 Claims, 3 Drawing Sheets

(56) References Cited

U.S. PATENT DOCUMENTS

| | | | | |
|---|---|---|---|---|
| 2009/0043441 A1* | 2/2009 | Breed | ............... | G06K 7/10178 |
| | | | | 701/31.9 |
| 2010/0017049 A1* | 1/2010 | Swearingen | ......... | G08G 5/0021 |
| | | | | 701/3 |
| 2015/0158499 A1* | 6/2015 | Koravadi | .................. | B60T 7/12 |
| | | | | 701/23 |
| 2015/0178647 A1* | 6/2015 | Wiggins | ............. | G06Q 10/0635 |
| | | | | 705/7.28 |
| 2015/0331422 A1* | 11/2015 | Hartung | ................ | G05D 1/021 |
| | | | | 701/23 |
| 2017/0139411 A1* | 5/2017 | Hartung | .................. | H04L 12/40 |
| 2017/0205824 A1* | 7/2017 | Nordbruch | ............ | B60W 10/18 |
| 2017/0240183 A1* | 8/2017 | Suzuki | .................. | B60W 40/08 |
| 2017/0269600 A1* | 9/2017 | Pink | ................. | B60W 50/0205 |
| 2018/0050704 A1* | 2/2018 | Tascione | ........... | B60W 50/0205 |
| 2018/0075538 A1* | 3/2018 | Konrardy | ............... | G06Q 40/08 |
| 2018/0136653 A1* | 5/2018 | Tao | ...................... | G05D 1/0055 |
| 2018/0164808 A1* | 6/2018 | Prokhorov | ............ | B60W 50/08 |
| 2018/0196434 A1* | 7/2018 | Hartung | ................ | G05D 1/021 |

* cited by examiner

RISK-BASED CONTROL OF A MOTOR VEHICLE

RELATED APPLICATION INFORMATION

The present application claims priority to and the benefit of German patent application no. 10 2015 224 696.5, which was filed in Germany on Dec. 9, 2015, the disclosure of which is incorporated herein by reference.

FIELD OF THE INVENTION

The present invention relates to risk-based control of a motor vehicle.

BACKGROUND INFORMATION

A motor vehicle can be controlled by a highly automated driving function. The function is called highly automated if a driver of the motor vehicle does not have to permanently monitor the function and thus is not available as fallback level, or only to some extent. For example, the driver may be assured of a takeover time of 15 seconds, of which he may avail himself in order to assume control of the motor vehicle from the highly automated driving function. This gives the driver the possibility to attend to matters not related to driving, or to sleep, for instance, while the vehicle is driving.

It cannot be expected that the components of a highly automated driving function operate completely without fault at all times. The driving function is usually made up of software components and/or hardware components. Each one of these components may fail; a hardware component such as a sensor, for instance, may have an electrical fault, or a software component may be operated outside its specification. However, the system as a whole must always be able to maintain a safe driving operation in the presence of such individual faults.

Some of these malfunctions are able to be diagnosed during the ongoing operation, and in the case of a fault, a switchover may take place from a first function component to a second function component, which then realizes an emergency operation (fallback).

The document WO 00 2013 060 530 A1 relates to a traffic jam assistance system, the proper functioning of which is monitored with the aid of an additional system, for instance an ACC system or a lane keeping assistant. If a predefined system limit is exceeded, then the traffic jam assistant is automatically deactivated.

SUMMARY OF THE INVENTION

The present invention is based on the objective of providing an improved control of a motor vehicle. The present invention achieves this objective by the subject matter of the independent claims.

The present invention is based on the recognition that there are also non-diagnosable faults and that the diagnosis of faults may itself potentially be infected with errors. If an existing fault case is not detected, then the first function component may be operated on the basis of faulty assumptions or faulty measured values, which can increase an accident risk of the motor vehicle. On the other hand, if a fault case is identified that does not even exist objectively, then a switchover to the second function component may mistakenly take place. The second function component usually does not use parameters that could be linked to the ascertained fault state, so that, overall, it generally carries out a less optimal control than the first function component. There may also be a higher accident risk in such a case.

As a consequence, it is proposed to determine, on a continuous basis if possible, how great the respective risk of an accident of the motor vehicle is for a first and a second function component and to continue the control of the motor vehicle in a corresponding manner with the aid of the particular function component whose allocated accident risk is the lowest. In particular, it is proposed not to switch to the second function component unconditionally when ascertaining a fault to which the first function component is exposed, but instead to switch only if it is confirmed by the risk analysis that the control with the aid of the second function component does indeed lower the accident risk. The switch from the first to the second function component thus depends on an assessment of the current driving situation and possibly on an assessment of the fault state.

A highly automated driving function for controlling a motor vehicle encompasses a plurality of function components. A method for controlling the motor vehicle includes steps of executing the driving function using a first function component, comparing the behavior of the first function component to a specified behavior, ascertaining that the behavior of the first function component deviates from the specified behavior, ascertaining a first accident risk if the driving function continues to be executed with the aid of the first function component, ascertaining a second accident risk if the execution of the driving function is continued with the aid of a second function component, and executing the driving function using the particular function component that has the lowest allocated accident risk.

This makes it possible to reduce an accident risk that results from an incorrect ascertainment of a fault state. The highly automated driving function is able to be carried out in an improved manner and a driver may be prompted less often to take over control of the motor vehicle.

It is generally assumed that a specification is available for the function component. An expert refers to faults within the meaning of this document as OOS (out of specification) or E/E (electric/electronic) faults. An E/E fault of a hardware component, for example, may include a malfunction of an execution device or a communications error between two components. An E/E fault of a software component may include an incorrect implementation, a programming error or a buffer overflow. An E/E fault is present when at least one function component exhibits a behavior other than a specified behavior. An insufficient specification is not considered a fault in this context.

Differentiated from E/E faults are ISP faults (In SPecification) or functional deficiencies, which, for instance, include a sensor that fails to fully detect an object, e.g., because of disadvantageous environmental conditions; a fusion of sensor data, so that the actually existing situation is not fully represented; or an insufficient specification of the situation interpretation, so that the future movement state of objects is unable to be fully predicted in a prediction, for example.

For each first function component that realizes a normal operation, a second function component must usually be provided which implements an emergency operation. The second function component, or the switchover to this second function component, generally does not distinguish between ISP and OOS faults. However, at least one E/E component is usually not available for the operation of the second function component, so that it is to be expected that the performance of the second function component is lower than that of the first function component when operated within its specification.

The function component may include hardware, software or a combination thereof. In particular, a multitude of function components may be provided in order to realize the highly automated driving function. A function component may itself include multiple function components, the first and the second function components possibly sharing one or more sub-function component(s). For example, a processor of an execution device may form the basis of the first and the second function component.

The first function component may be more complex than the second function component. The reduced complexity may enhance the execution reliability of the second function component.

The accident risk may be ascertained for an accident that exceeds a predefined threshold value in severity. In other words, only accident risks whose severity lies above the threshold value may be taken into consideration. If the accident risk lies below the threshold value, then correct functioning of the respective function component may be assumed. The severity can be ascertained on the basis of anticipated damage to the motor vehicle, to a passenger or to an object outside the motor vehicle.

Multiple second function components may be provided, and an accident risk may be determined for each second function component. If the accident risk of one of the second function components lies below the accident risk of the first function component, then the execution of the highly automated driving function may continue on this second function component.

It is also possible to implement a switchover from a second function component to a first function component when the accident risk of the first function component has dropped below the accident risk of the second function component.

A takeover of the driving function by a driver may be initiated if the accident risk of the executed driving function lies above a predefined threshold value. Parallel with the control of the motor vehicle by the function component that can be operated at the lowest risk, it is possible to alert the driver in order to provide an even better control of the motor vehicle. The highly automated control of the motor vehicle in the case of a fault is thereby able to be restricted to a minimum.

A computer program product includes program code means for executing the afore-described method when the computer program product is running on a processing device or is stored on a computer-readable data carrier.

A highly automated driving function is configured to execute the afore-described method.

The present invention will now be described in greater detail with reference to the appended figures.

DETAILED DESCRIPTION

Figure 1:
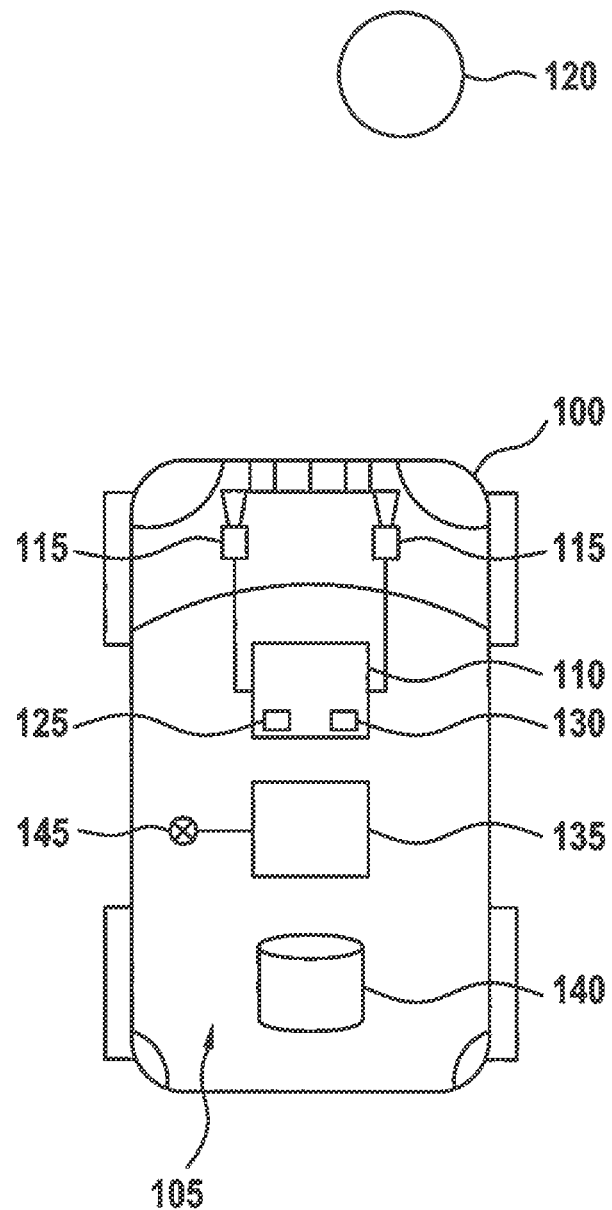
FIG. 1 shows a motor vehicle having a highly automated driving function.

FIG. 1 shows a motor vehicle 100 having a system 105 for controlling motor vehicle 100. System 105 is configured to execute a highly automated driving function, in particular a longitudinal or lateral control of motor vehicle 100. For this purpose, system 105 includes a processing device 110 which is connected to one or more sensor(s) 115. With the aid of sensors 115, it is possible to scan an environment of motor vehicle 100 in order to detect an external object 120, for instance. Processing device 110 may also be linked to another system on board of motor vehicle 105 or may be integrated therein in order to ascertain a driving parameter or a driving state of motor vehicle 100.

The highly automated driving function is realized by at least one first function component 125 and one second function component 130, which are shown within processing device 110 for easier understanding. Each function component 125, 130 may encompass a respective hardware component such as a communications interface, an execution device or a sensor 115, a software component such as a function block, or a combination of both. A great number of function components 125, 130 are usually provided in system 105, which may be connected to one another in order to realize the highly automated driving function. First function component 125 realizes a normal function in this particular example, and second function component 130 realizes an emergency function. The configuration of the main function is usually more complex than that of the emergency function; for example, the emergency function is able to operate with a reduced number of sensor values or with less complex algorithms. In this particular example, the goal of both functions is to avoid a collision of motor vehicle 100 with object 120 by appropriately influencing a longitudinal or lateral control of motor vehicle 100.

In one example, first function component 125 includes a combination of hardware and software and is configured to ascertain a movement of object 120 in relation to motor vehicle 100. The hardware may encompass function components such as an ultrasonic sensor 115, a supply line, a communications interface and processing device 110. The software may include a driver for sensor 115 and one or more function block(s), which derive movement data from the scanned data in a step-by-step manner. The movement is able to be plausibilized on the basis of movement information of motor vehicle 100, for example, and it is possible to use a model for object 120 that distinguishes between a pedestrian and another motor vehicle.

The second function component 130 may use the same hardware, but start from simplified approaches in the software. For instance, only a general object 120 may be assumed, whose movement is not plausibilized on the basis of further information, or for which no further differentiation is made as to pedestrian or motor vehicle.

A monitoring device 135 compares a behavior of first function component 125 to a predefined specification 140, which is figuratively represented here by the symbol for a database. Monitoring component 135 may also be integrated into processing device 110 and, in particular, may itself be realized by one or more function component(s) 125, 130. Specification 140 can be predefined as a formal description or in the form of a logic, for instance. Monitoring device 135 is able to compare inputs and outputs of processing device 110 to specification 140. It is also possible to compare intermediate results or inputs and/or outputs of individual function blocks or subcomponents of function components 125, 130 to specification 140.

If monitoring device 135 determines that the behavior of first function component does 125 not comply with specification 140, then it is able to deactivate first function component 125 and activate second function component 130. To do so, monitoring device 135 in particular is able to send a signal to processing device 110.

In addition, monitoring device 135 can output an optical, acoustic or haptic signal to a driver of motor vehicle 100 using an output device, in order to prompt the driver to take over control of motor vehicle 100. The driver may be granted a predefined minimum time for the take-over.

It is proposed that monitoring device 135 not switch over to second function component 130 unconditionally when it has detected a deviation in the behavior of first function component 125 from specification 140; instead, monitoring device 135 should first check whether an execution of the automated driving function with the aid of second function component 130 poses a lower accident risk than the continued execution with the aid of first function component 125. A switch from the first function component 125 to second function component 130 may take place only in such a case. The switch to second function component 130 can thereby be minimized and the accident risk of motor vehicle 100 be reduced.

Figure 2:
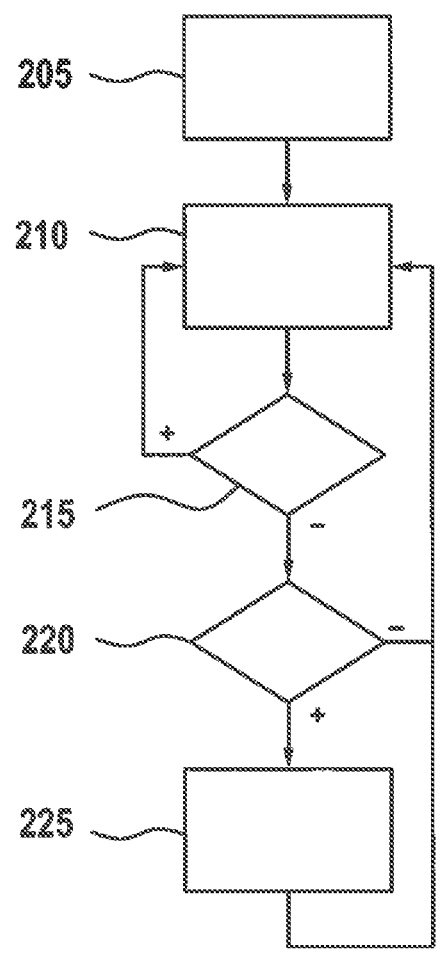
FIG. 2 shows a flow chart of a method for controlling the motor vehicle of FIG. 1.

FIG. 2 shows a flow chart of a method 200 for controlling motor vehicle 100 of FIG. 1. Method 200 begins in a step 205 in which first function component 125 is selected as the particular component by which a highly automated driving function is to be realized. In a step 210, the highly automated driving function is executed by selected function component 125, 130.

For example, in parallel therewith or periodically, it is checked in a step 215 whether the behavior of selected function component 125, 130 or the highly automated driving function corresponds to the demands of specification 140. If this is the case, method 200 may return to step 210 and run through it again. On the other hand, if it is determined that the scanned behavior lies outside of specification 140, then a greater accident risk may exist for motor vehicle 100 on account of a fault state.

In this case, a first accident risk for motor vehicle 100 in a further execution of the highly automated driving function with the aid of first function component 125, and a second accident risk for the execution of the highly automated driving function with the aid of second function component 130 are ascertained in a step 220. In another specific embodiment, the first accident risk may also already be ascertained in advance, for instance as within the framework of step 215. Both accident risks may be ascertained with regard to a predefined severity of an accident, so that an only light accident, which most likely will not entail any personal injury, for instance, may be tolerated.

The two ascertained risks are compared to each other and it is determined whether the accident risk in a switchover to second function component 130 is indeed lower than in a continued execution by first function component 125. In one specific embodiment, only the accident risks for the execution of the highly automated driving function by function components 125, 130 are evaluated; in another specific embodiment, it is additionally taken into account that the switchover itself may entail a certain accident risk. For example, second function component 130 may consider data of a time period in the past, and in the switchover these data may initially not be available for the current point in time. The performance of second function component 130 may thus be reduced in the beginning, so that the accident risk may be increased. If second function component 130 has been running for a longer period of time, the additional risk may no longer exist.

If it was determined that the accident risk of the motor vehicle is able to be reduced by the switchover of function components 125, 130, then the second function component may be selected in a step 225 as the particular function component by which the highly automated driving function is to be realized. In addition, a signal may be output to a driver of motor vehicle 100 to inform him of the switchover or to prompt him to assume control of motor vehicle 100. The method can then return to step 210 and be run through again.

A switchback from the second to first function component 125, 130 may take place in the same manner. In another specific embodiment, step 215 may be omitted for second function component 130, so that a switchback is checked on a permanent basis and not only when second function component 130 causes an operation outside of specification 140.

Figure 3:
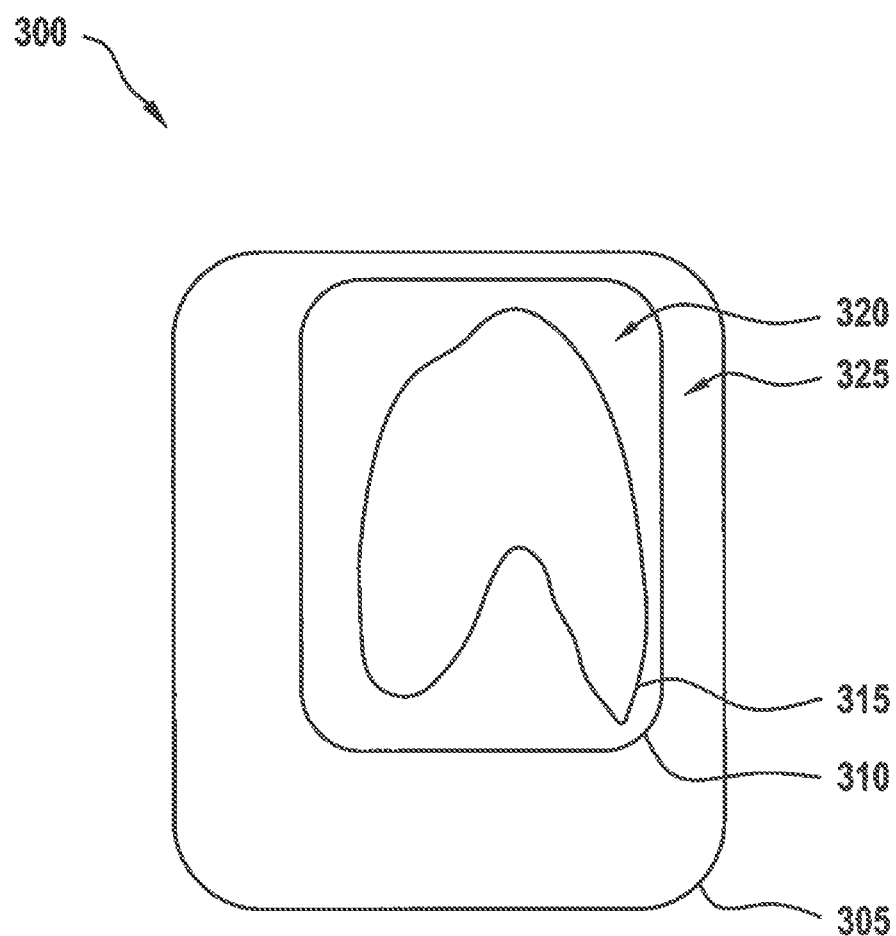
FIG. 3 shows an illustration of risks in the highly automated driving of the motor vehicle of FIG. 1.

FIG. 3 shows a representation 300 of avoided accidents and of accidents that were not avoided during an operation of the highly automated driving function. A first range 305 graphically represents the ascertained E/E faults (OOS faults). A second range 310, which is a sub-range of first range 305, represents undetected E/E faults. A third range 315, which is a sub-range of second range 310, shows a system implementation inside specification 140.

An accident-free control of the motor vehicle takes place in third range 315, since system 105 or motor vehicle 100 here behaves as provided by specification 140. A first differential range 320, which graphically corresponds to a quantity subtraction of third range 315 from second range 310, represents accidents that are caused by undetected E/E faults. A second differential range 325, which corresponds to a subtraction of second range 310 from first range 305, represents avoided accidents due to detected E/E faults.

What is claimed is:

1. A method for controlling a motor vehicle with the aid of a highly automated driving function, which encompasses a plurality of function components, the method comprising: executing a driving function using a first function component, wherein the driving function is a longitudinal or lateral control of the motor vehicle; comparing a behavior of the first function component to a specified behavior; ascertaining that the behavior of the first function component deviates from the specified behavior; ascertaining a first accident risk for the first function component, wherein the ascertaining of the first accident risk assumes a situation in which the driving function continues to be executed using the first function component; ascertaining a second accident risk for a second function component, wherein the ascertaining of the second accident risk assumes a situation in which the execution of the driving function switches over to and continues execution of the driving function of a using the second function component instead of the first function component, wherein the ascertaining of the second accident risk includes ascertaining a risk related to the switchover from the first function component to the second function component; and executing the driving function using a particular one of the first function component and the second function component, whose ascertained accident risk is the lowest.

2. The method of claim 1, wherein each of the first function component and the second function component includes hardware, software, or a combination thereof.

3. The method of claim 1, wherein the first function component is more complex than the second function component.

4. The method of claim 1, wherein the first accident risk and the second accident risk are risks for an accident whose severity exceeds a predefined threshold value.

5. The method of claim 1, wherein multiple second function components is provided, and the second accident risk is determined for each second function component.

6. The method of claim 1, wherein a takeover of the driving function by a driver is initiated if the accident risk of the executed driving function lies above a predefined threshold value.

7. A non-transitory computer readable medium on which is stored a computer program including program code for controlling a motor vehicle with the aid of a highly automated driving function, which encompasses a plurality of function components, the computer program, when executed by a processor, causing the processor to perform: executing a driving function using a first function component, wherein the driving function is a longitudinal or lateral control of the motor vehicle; comparing a behavior of the first function component to a specified behavior; ascertaining that the behavior of the first function component deviates from the specified behavior; ascertaining a first accident risk for the first function component, wherein the ascertaining of the first accident risk assumes a situation in which the driving function continues to be executed using the first function component; ascertaining a second accident risk for a second function component, wherein the ascertaining of the second accident risk assumes a situation in which the execution of the driving function switches over to and continues execution of the driving function using the second function component instead of the first function component, wherein the ascertaining of the second accident risk includes ascertaining a risk related to the switchover from the first function component to the second function component; and executing the driving function the using a particular one of the first function component and the second function component, whose ascertained accident risk is the lowest.

8. A device for controlling a motor vehicle with the aid of a highly automated driving function, which encompasses a plurality of function components, comprising: a control arrangement including hardware configured to perform the following: executing a driving function using a first function component, wherein the driving function includes a longitudinal or lateral control of the vehicle; comparing a behavior of the first function component to a specified behavior; ascertaining that the behavior of the first function component deviates from the specified behavior; ascertaining a first accident risk for the first function component, wherein the ascertaining of the first accident risk assumes a situation in which the driving function continues to be executed using the first function component; ascertaining a second accident risk for a second function component, wherein the ascertaining of the second accident risk assumes a situation in which the execution of the driving function switches over to and continues execution of the driving function using the second function component instead of the first function component, wherein the ascertaining of the second accident risk includes ascertaining a risk related to the switchover from the first function component to the second function component; and executing the driving function using a particular one of the first function component and the second function component, whose ascertained accident risk is the lowest.

9. The method as recited in claim 1, wherein each of the ascertaining of the first accident risk and ascertaining of the second accident risk includes ascertaining with regard to a predefined severity of an accident.

10. The method as recited in claim 1, further comprising: based on the ascertaining that the behavior of the first function component deviated from the specified behavior, performing: comparing the ascertained first accident risk to the ascertained second accident risk; determining the ascertained second accident risk is not lower than the ascertained first accident risk; and based on determining the ascertained second accident risk is not lower than the ascertained first accident risk, continue executing the driving function using the first function component despite the ascertaining that the behavior of the first function component deviated from the specified behavior.

11. The method as recited in claim 1, further comprising: based on the ascertaining that the behavior of the first function component deviated from the specified behavior, performing: comparing the ascertained first accident risk to the ascertained second accident risk; determining the ascertained second accident risk is lower than the ascertained first accident risk; and based on determining the ascertained second accident risk is lower than the ascertained first accident risk, switching over the driving function from executing the driving function using the first function component to executing the driving function using second function component.

12. The method as recited in claim 11, further comprising: based on determining the ascertained second accident risk is lower than the ascertained first accident risk, prompting a driver of the vehicle to assume control of the motor vehicle.

* * * * *